United States Patent [19]

Otaka

[11] Patent Number: 5,001,610
[45] Date of Patent: Mar. 19, 1991

[54] AUTOMOBILE LAMP
[75] Inventor: Nobuo Otaka, Shimizu, Japan
[73] Assignee: Koito Manufacturing Co., Ltd., Tokyo, Japan
[21] Appl. No.: 550,924
[22] Filed: Jul. 11, 1990
[30] Foreign Application Priority Data
Jul. 12, 1989 [JP] Japan ................ 1-180087
[51] Int. Cl.⁵ ................ B60Q 1/00; F21V 3/00
[52] U.S. Cl. ................ 362/61; 362/80; 362/311
[58] Field of Search ........... 362/61, 80, 240, 267, 362/307, 311

[56] References Cited
U.S. PATENT DOCUMENTS
4,241,388 12/1980 Green .
4,383,290 5/1983 Binder et al. .
4,833,572 5/1989 Nagengast .................. 362/61

Primary Examiner—Allen M. Ostrager
Attorney, Agent, or Firm—Browdy and Neimark

[57] ABSTRACT

An automobile lamp including a lamp body provided with a light source and a lens covering a front opening of the lamp body, wherein a mounting groove is formed in the periphery of the front opening of the lamp body, the lens has a peripheral wall for fitting in the mounting groove, a generally dark colored composition is interposed between the mounting groove in the lamp body and the peripheral wall of the lens, and a color coating is applied on a peripheral portion of the lens surface with the color of which coating being substantially same to and fainter than that of the composition, so that the lamp has so-called gradation effects.

12 Claims, 8 Drawing Sheets

AUTOMOBILE LAMP

FIELD OF THE INVENTION

The present invention relates to an automobile lamp and, particularly to an automobile lamp having so-called gradation effects.

DESCRIPTION OF PRIOR ART

A lamp having the so-called gradation effects has a deep color in the peripheral portion and which color is fainted gradually or gradated in the direction toward the central portion of the lens as viewed from the front when the lamp is not lit. It is preferable to apply such gradation effects on a stop lamp or the like which can reduce the size of the lamp in appearance to the minimum when the lamp is not lit thereby it is possible to improve the appearance in design of the vehicle.

FIG. 7A and FIG. 7B show one example of prior art rear combination lamp, in which, a tail and stop lamp for emitting red light and a back up lamp for emitting white light are combined into one unit and are mounted on the rear portion of a vehicle. As shown in the drawings, two electric bulbs are mounted in a common lamp body a which has a lens mounting groove b in the peripheral portion. A peripheral wall portion c' of an outer lens c is fitted in the mounting groove b and secured thereto by means of hot melt bonding agent d of a color of grey or ambor. An inner lens e is applied to have a first smoke coating $f_1$, a second smoke coating $f_2$ and a third smoke coating $f_3$ as shown in the drawings. The third coating may be omitted if desired. Thus, the thickness of smoke coating layer is increased at the peripheral portion and is decreased in the direction toward the central portion as shown in FIG. 7B. As viewed from the outside when the lamp is not lit, the color of the lens is gradated, from the central portion of the lens, toward the peripheral portion of the lens and toward the body of the vehicle, into a generally dark color, thus, the size of the lamp in appearance when the lamp is not lit can be reduced and it is possible to improve the appearance in design of the vehicle.

For attaining such gradation effects, it has been required to apply a plural times of smoke coatings on the inner lens e, which procedure is troublesome and, thus, it is expensive.

SUMMARY OF THE INVENTION

An object of the invention is to avert above mentioned shortcomings and, according to the invention, there is provided an automobile lamp including a lamp body provided with a light source and a lens covering a front opening of the lamp body, wherein the lamp body is formed to have a mounting groove in the periphery of the front opening, the lens is formed to have a peripheral wall projecting rearward for fitting in the mounting groove, a colored composition is interposed between the mounting groove of the lamp body and the peripheral wall of the lens, and peripheral portion of the front surface of the lens is applied with a color coating with the color of which coating being substantially same to and fainter than that of the composition.

According to a preferred embodiment of the invention, there is provided an automobile lamp including a lamp body provided with a light source, an outer lens covering a front opening of the lamp body and an inner lens disposed inside of the outer lens, wherein the lamp body is formed to have a mounting groove in the periphery of the front opening, the outer lens is formed to have a peripheral wall projecting rearward for fitting in the mounting groove, a colored composition is interposed between the mounting groove of the lamp body and the peripheral wall of the outer lens, and the peripheral portion of the front surface of the inner lens is applied with a color coating with the color of which coating being substantially same to and fainter than that of the composition.

Thus, according to the invention, when the lamp is not lit, the color of the lens is gradated or fainted, from the peripheral portion of the lens toward the central portion of the lens, with the color of the peripheral portion of the lens being of a generally dark color and similar to that of the body of the vehicle, thus, the size of the lamp in appearance when the lamp is not lit can be reduced to the minimum and it is possible to improve the appearance in design of the vehicle. And such gradation effects can be attained by applying at least one coating procedure on the peripheral portion of the lens.

BRIEF DESCRIPTION OF THE DRAWINGS

Further objects and effects of the invention will become apparent from the following detailed description become apparent from the following detailed description tion in conjunction with the drawings, in which.

DETAILED DESCRIPTION OF PREFERRED EMBODIMENTS

Figure 1:
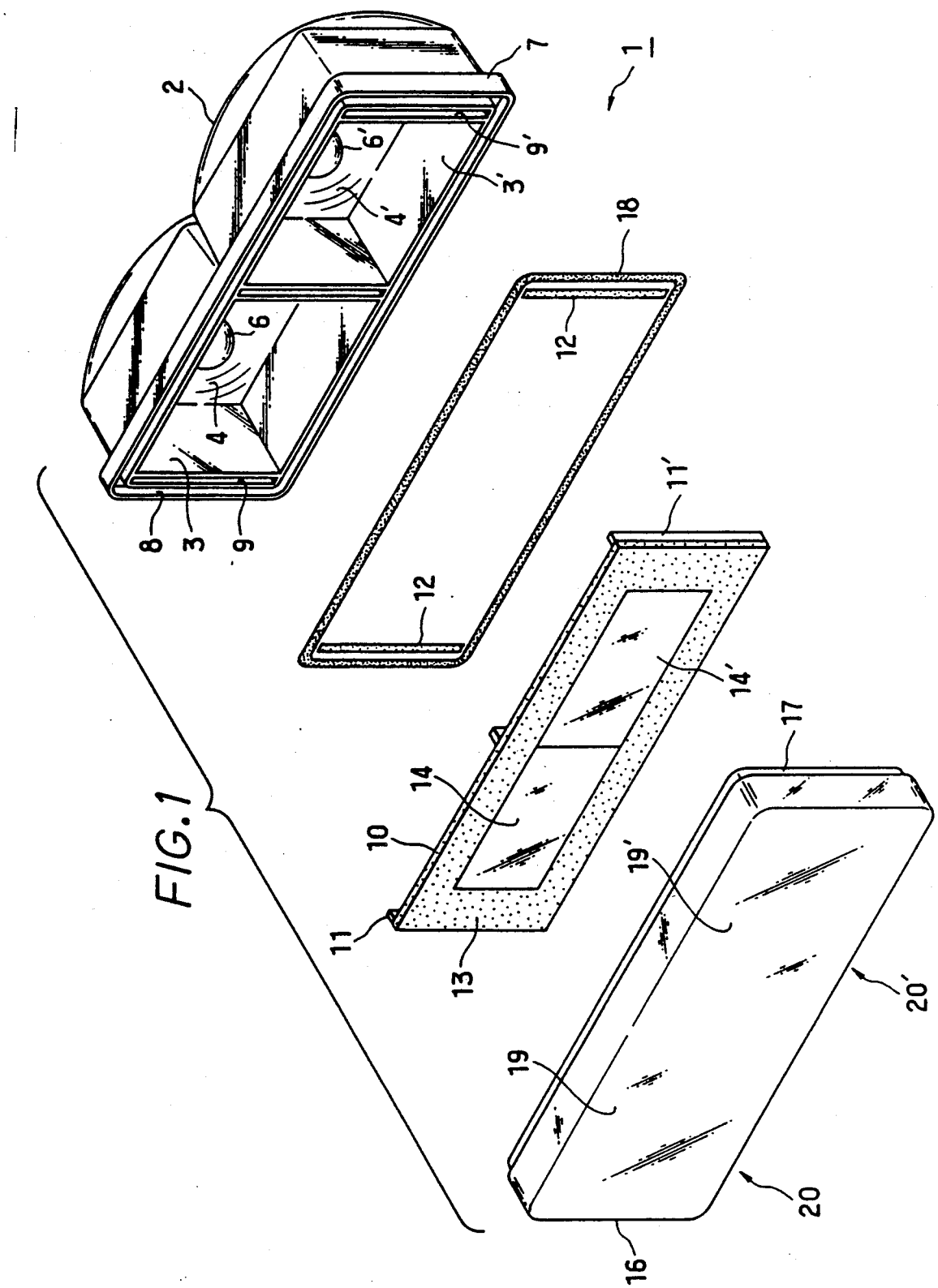
FIG. 1 is a perspective exploded view of an automobile lamp according to a first embodiment of the invention.
Figure 2:
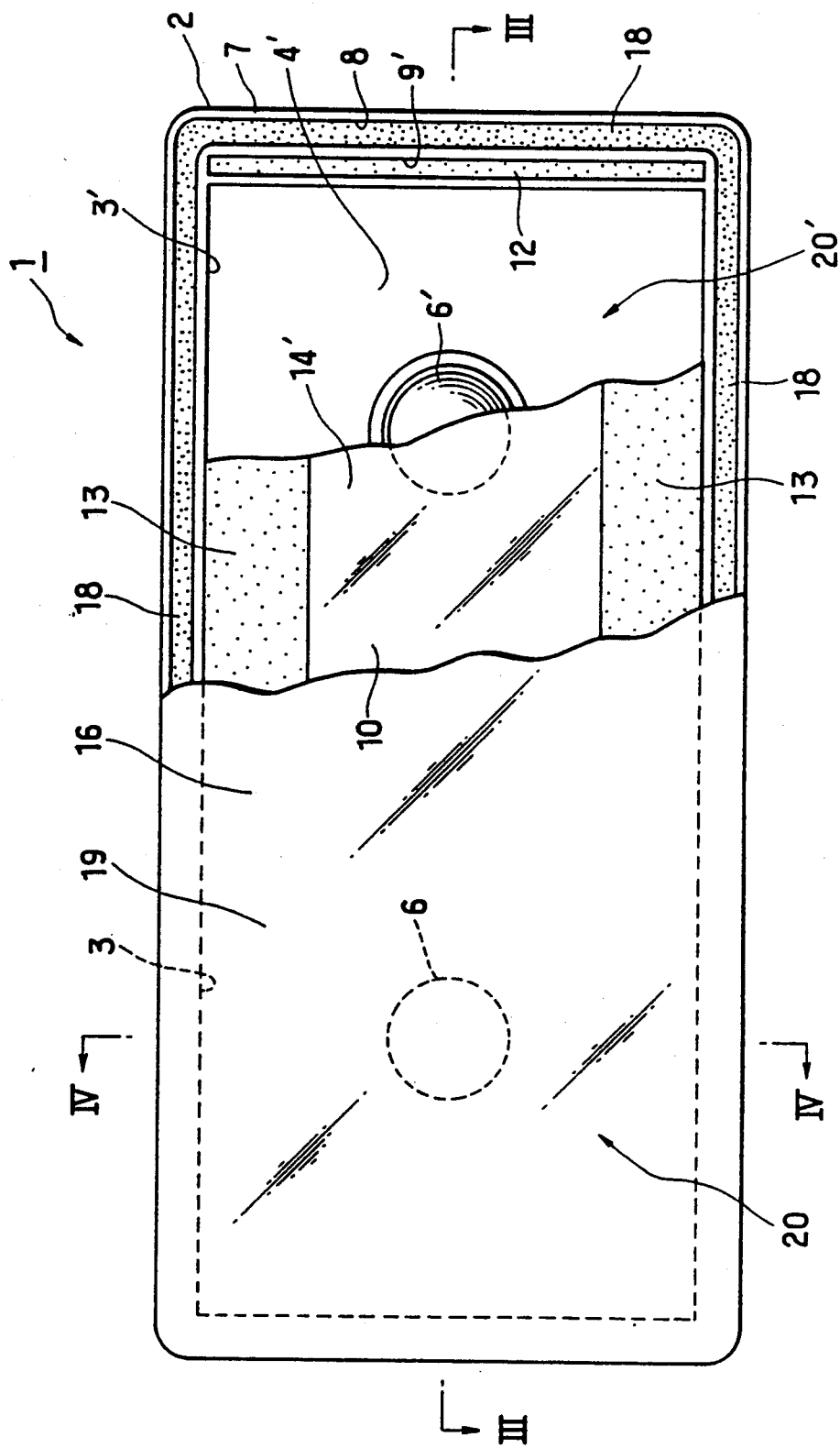
FIG. 2 is a partially broken enlarged front view of the lamp of FIG. 1.
Figure 3:
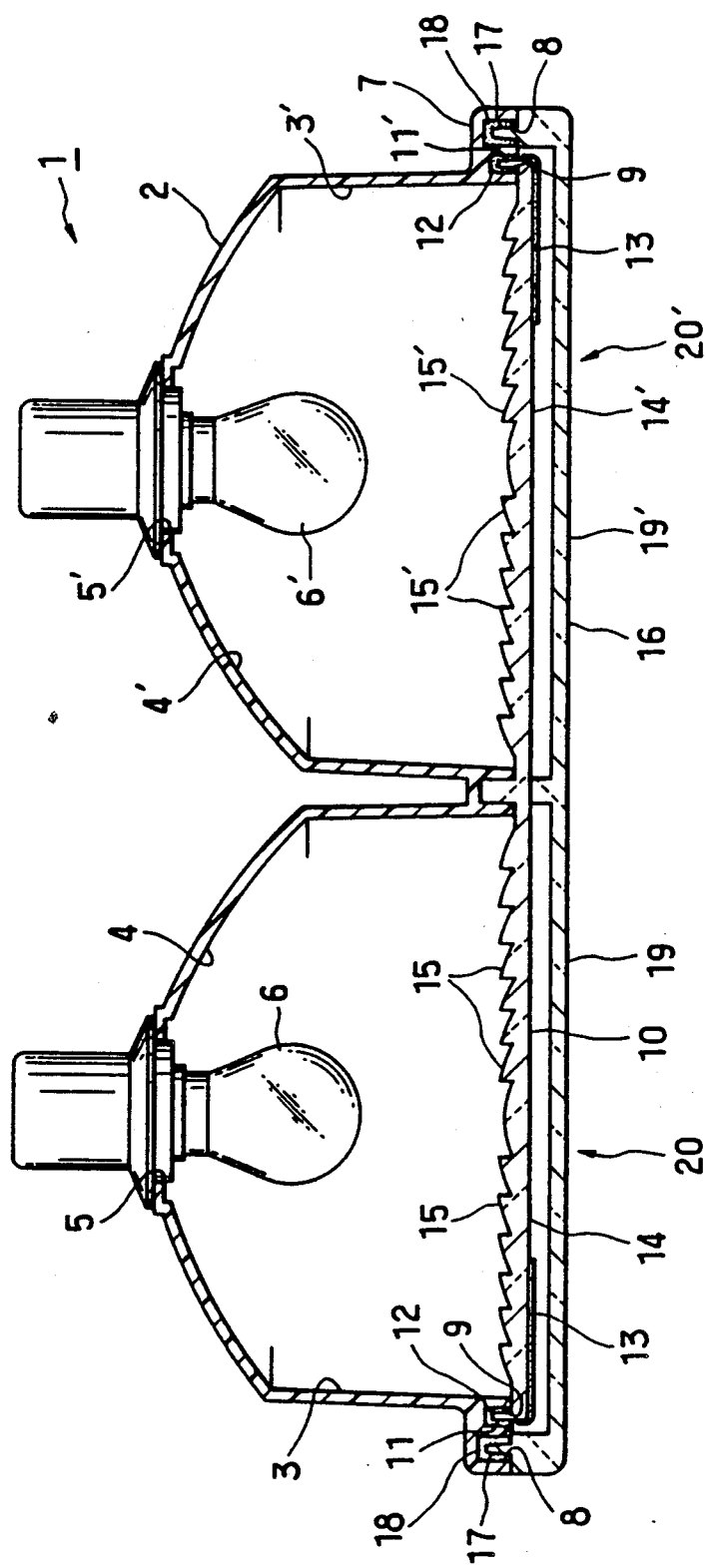
FIG. 3 is a section view taken along line III—III in FIG. 2.
Figure 4:
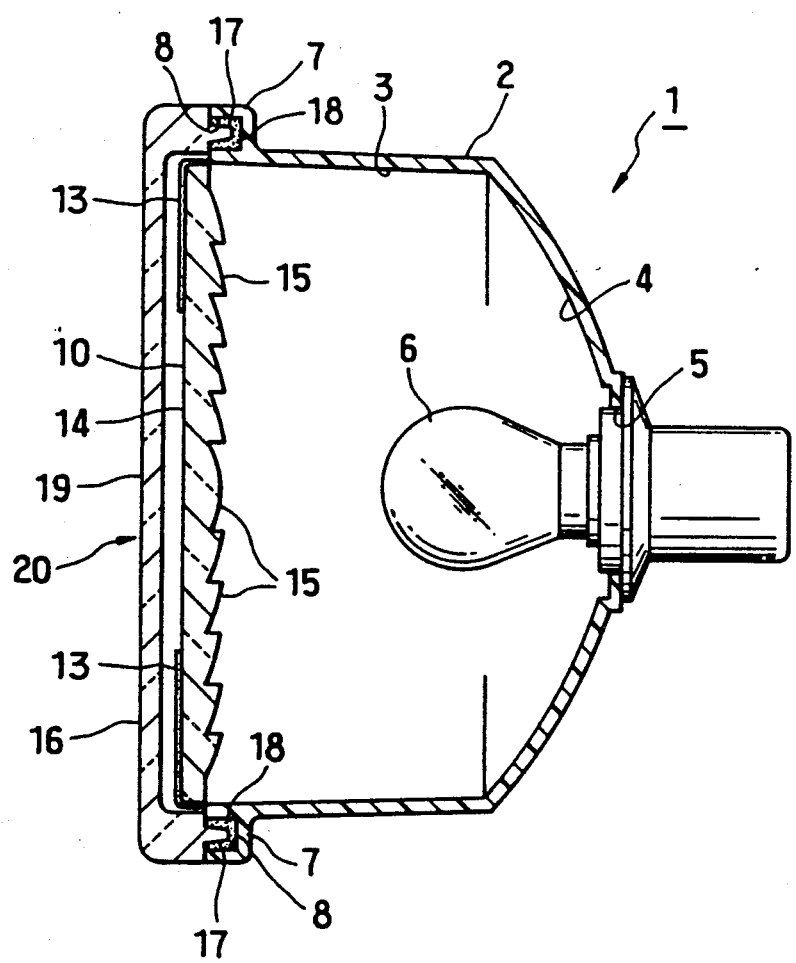
FIG. 4 is an enlarged section view taken generally along line IV—IV in FIG. 2.

First Embodiment (FIG. 1 through FIG. 4)

Shown at numeral 2 is a lamp body formed of synthetic resin material and is formed integrally to have two lamp chambers 3 and 3' which define respectively recesses 4 and 4' opening in the front direction. Respective bulb mounting openings 5 and 5' are formed respectively in the lamp chambers 3 and 3' for mounting electric bulbs 6 and 6' respectively.

Shown at numeral 7 is a flange extending outward from the edge of the front opening of the lamp body 2. There is formed in the flange 7 a lens mounting groove 8 along the entire circumference which opens in the forward direction. Further, lens mounting grooves 9 and 9' are formed inside of and adjacent to left and right side portions of the mounting groove 8 respectively.

Shown at numeral 10 is an inner lens being formed of a transparent synthetic resin material, and has rearward projecting peripheral wall portions 11 and 11' on left and right sides respectively and, which wall portions 11 and 11' of the inner lens 10 are fitted respectively in the lens mounting grooves 9 and 9' of the lamp body 2 and are secured thereto by hot melt bonding agent 12 of a grey color. The bonding agent 12 may be substituted by any suitable composition such as a sealing agent and the like of a dark color. Thus, the inner lens 10 is mounted on the lamp body 2.

The inner lens 10 is applied on the peripheral portion of the front surface thereof with a smoke coating 13 of a grey color as shown in FIG. 1. The inner lens 10 covers the front openings of respective lamp chambers 3 and 3' and may be deemed to consist of a lens portion 14 covering the lamp chamber 3 and a lens portion 14' covering the lamp chamber 3'. The lens portion 14 is transparent and red color, and the lens portion 14' is transparent and colorless. Further, there are formed on inside surfaces of respective lens portions 14 and 14' or on surfaces facing the electric bulbs 6 and 6' respectively a plurality of Fresnel lens elements 15, 15 —and 15', 15'—whereby the light emitted from respective bulbs 6 and 6' are formed into generally parallel light beams in passing through respective lens portions 14 and 14'.

Shown at numeral 16 is an outer lens disposed outside of the inner lens 10 and formed of transparent synthetic resin material having a pale smoke color. There are formed a peripheral wall portion 17 on the circumference of the outer lens 16 to extend in the rear direction from the front surface thereof. The rear edge of the peripheral wall portion 17 is fitted in the lens mounting groove 8 in the lamp body 2 and a hot melt bonding agent 18 of black color is interposed therebetween and the outer lens 16 is secured to the lamp body 2. The bonding agent 18 acts also to seal the interior of the lamp body 2 from dust and moisture. It will be understood that the bonding agent 18 may be substituted by any suitable composition having preferably sealing effects.

The outer lens 16 may be deemed consisting of a lens portion 19 facing the lamp chamber 3 and a lens portion 19' facing the lamp chamber 3'.

Thus, a lamp portion 20 acting as a tail and stop lamp and consisting of the electric bulb 6, the lamp chamber 3, the red transparent lens portion 14 of the inner lens 10 and the lens portion 19 of the outer lens 16; and a lamp portion 20' acting as a back lamp and consisting of the electric bulb 6', the lamp chamber 3', the colorless transparent lens portion 14' of the inner lens 10 and the lens portion 19' of the outer lens 16'; are combined integrally into the rear combination lamp 1.

Function

In the rear combination lamp 1, the rear edge of the peripheral wall portion 17 projecting rearward from the periphery of the outer lens 16 is fitted in the lens mounting groove 8 in the flange 7 of the lamp body 2, and suitable composition such as the black colored hot melt bonding agent 18 is interposed between the groove 8 and the peripheral wall portion 17 to attain sealing and bonding effects; and a grey colored smoke coating 13 is applied on peripheral portion of the front surface of the inner lens 10.

Thus, when the lamp 1 is not lit, the peripheral portion of the outer lens 16 is seen to have a black color due to the color of the black hot melt bonding agent 18, a portion adjacent to and inner side of the first mentioned portion is seen to have a grey color due to the smoke coating 13 being applied on the peripheral portion of the front surface of the inner lens 10, and a portion inner side of the second mentioned portion or the central portion of the lamp is seen to have the color of the outer lens 16 itself. Thus, the color is gradated or fainted gradually or steppingly from the black color in the peripheral portion toward the color of the outer lens 16 in the central portion.

Figure 5:
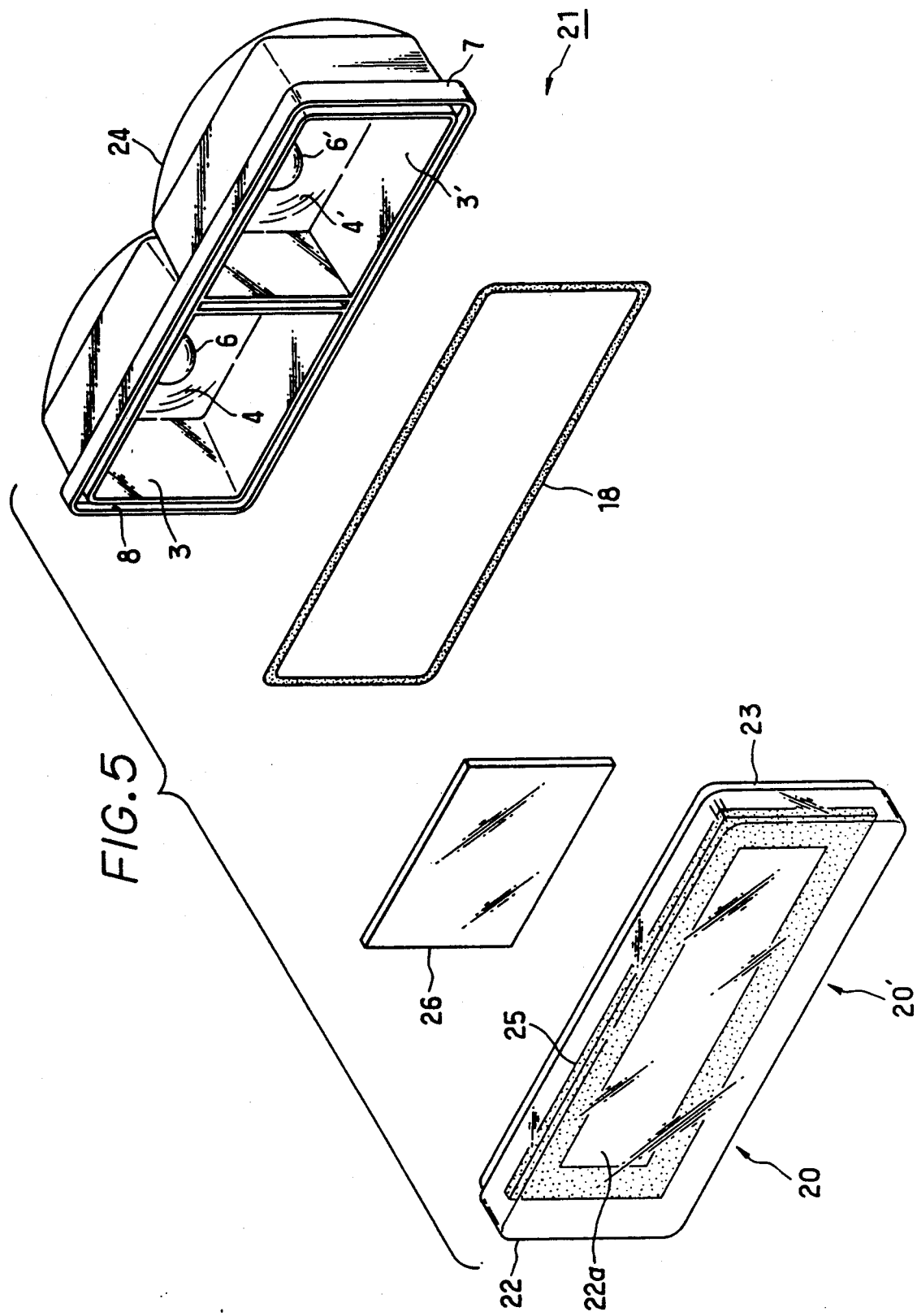
FIG. 5 is a perspective exploded view of an automobile lamp according to a second embodiment of the invention.
Figure 6:
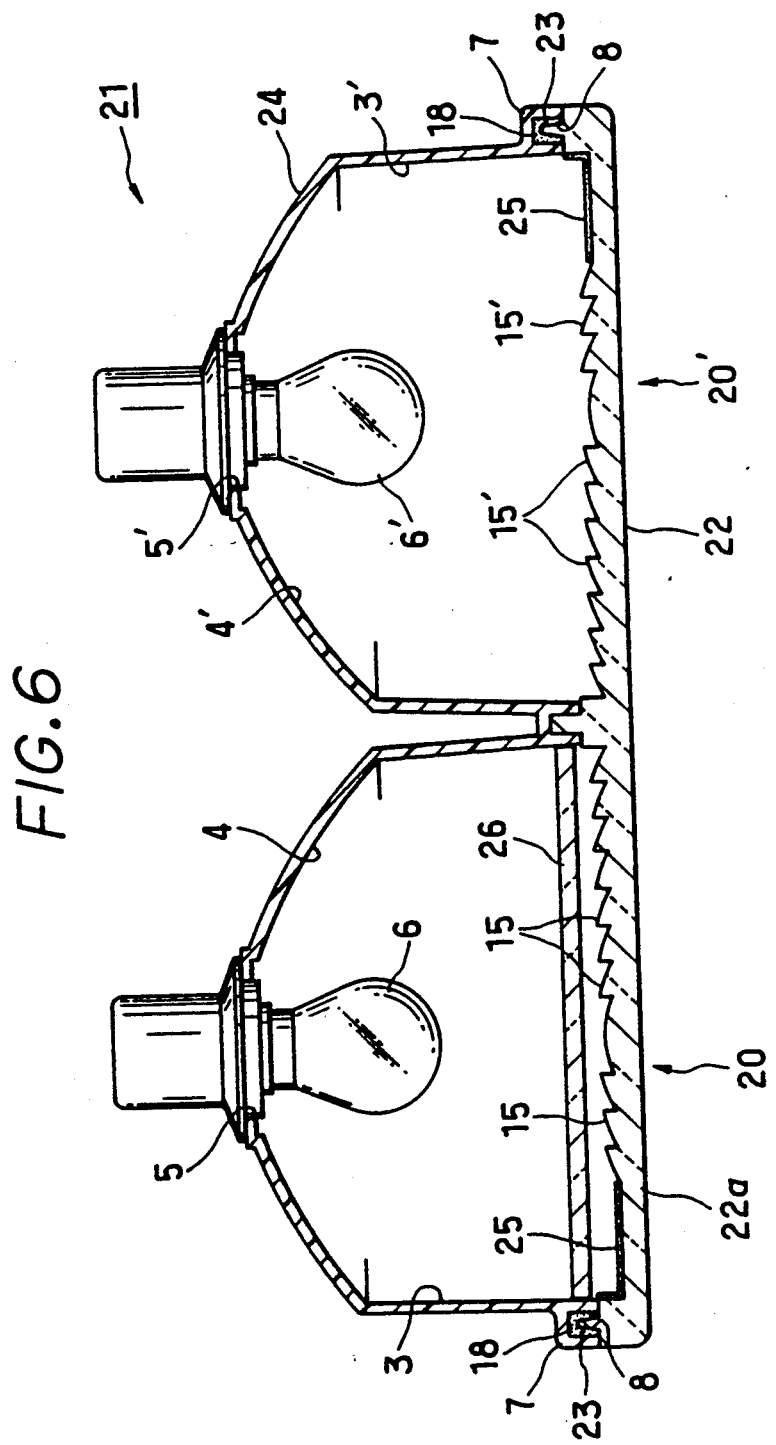
FIG. 6 is an enlarged horizontal section view of FIG. 5.
Figure 7A:
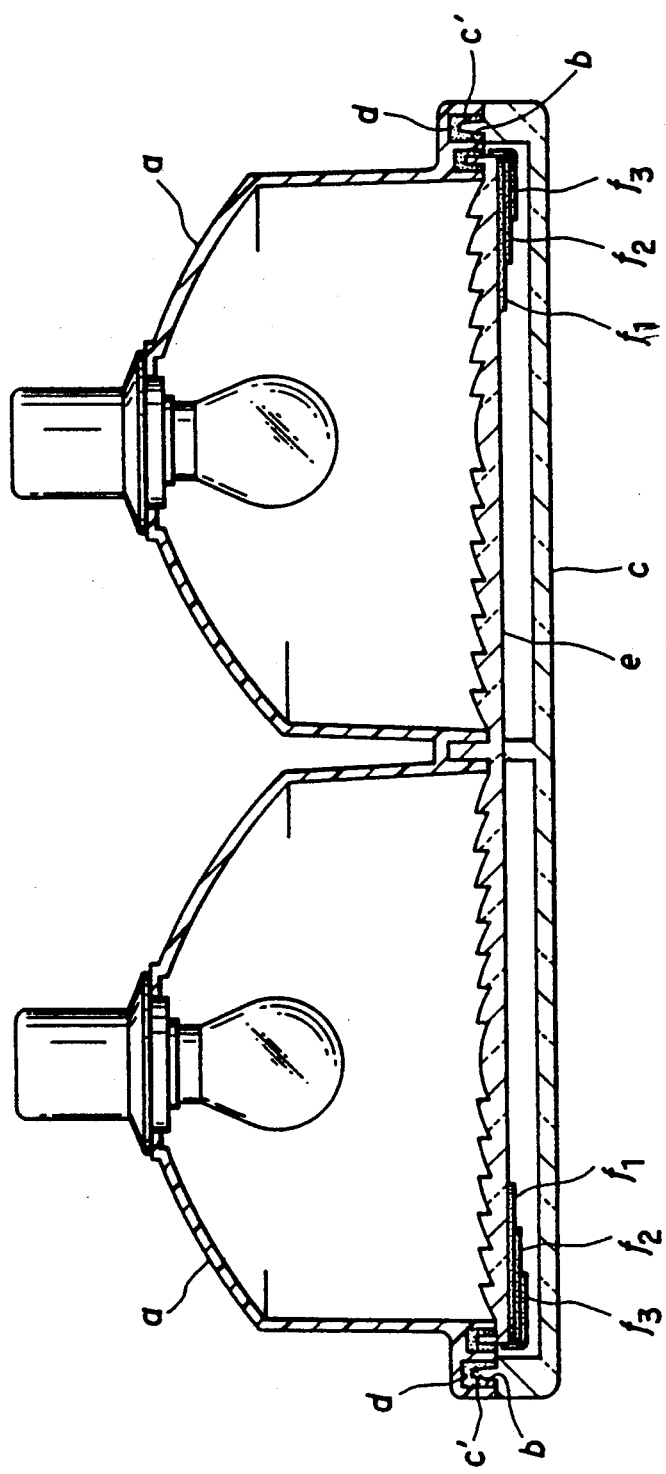
FIG. 7A is a horizontal section view of a prior art automobile lamp.
Figure 7B:
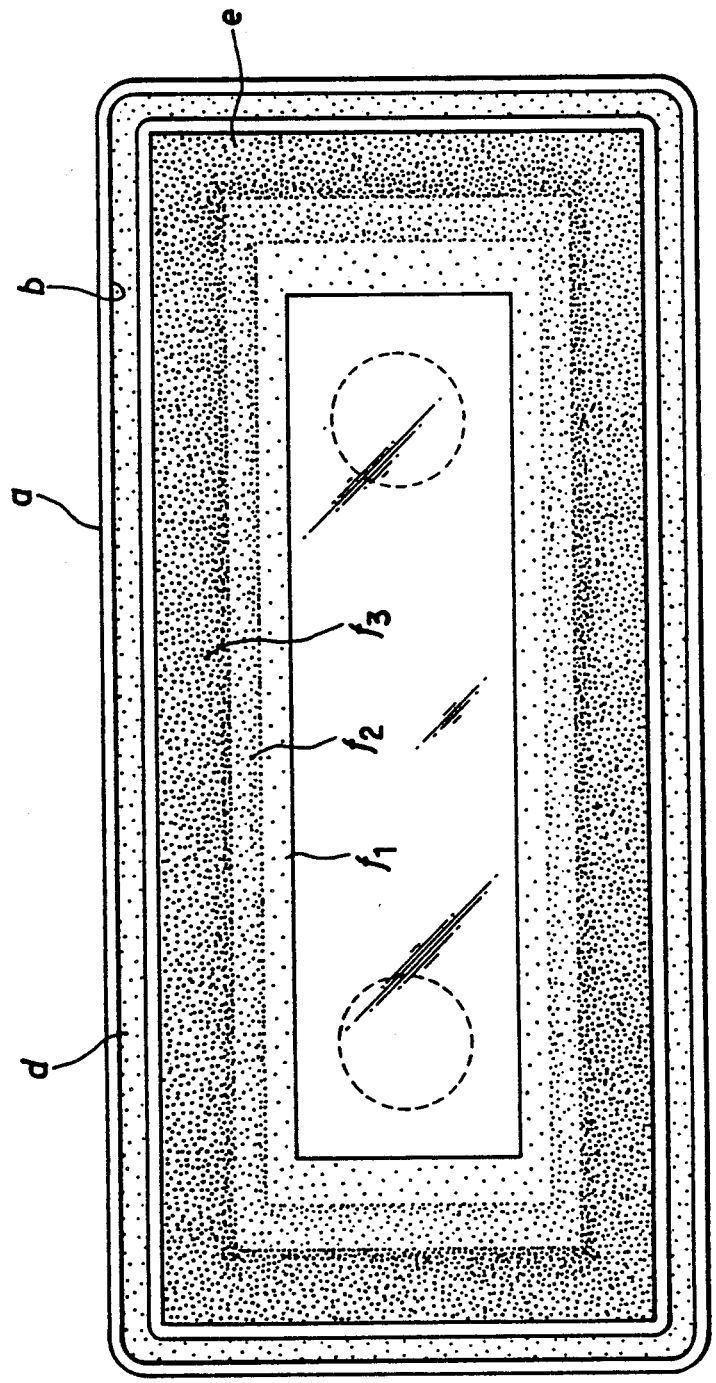
FIG. 7B is a front view of the prior art lamp of FIG. 7A with an outer lens being removed.

Second Embodiment (FIGS. 5 and 6)

FIGS. 5 and 6 show an automobile lamp 21 according to the second embodiment of the present invention.

The second embodiment differs from the lamp 1 of the first embodiment in that only one lens 22 is provided and that the smoke coating of grey color is applied on inner surface of the lens 22. Thus, parts corresponding to the first embodiment are denoted by the reference numerals same to that of the first embodiment and detailed description therefor is omitted.

The lens 22 is formed of a transparent synthetic resin material and has on the circumference a peripheral wall portion 23 extending rearward from the front surface thereof, and the rear edge of the peripheral wall portion 23 is fitted in the lens mounting groove 8 formed in the flange 7 of a lamp body 24. The black hot melt bonding agent 18 is interposed between the groove 8 and the wall portion 23 of the lens 22.

A grey color smoke coating 25 is applied on the peripheral portion of inner surface of the lens 22. The lens 22 is colorless and transparent through the entire surface, and a filter 26 of an amber color is disposed between a lens portion 22a covering the one lamp chamber 3 and the bulb 6 so that the bulb 6 and the lens portion 22a of the lens 22 acts as a turn signal lamp.

Function

In the rear combination lamp 21, the rear end of the peripheral wall portion 23 of the lens 22 is fitted in the lens mounting groove 8 which is formed in the flange 7 of the lamp body 24, and there is applied between the peripheral wall portion 23 and the lens mounting groove 8 black colored hot melt bonding agent 18; and there is applied grey colored smoke coating 25 on the peripheral portion of the rear surface of the lens 22.

Thus, when the lamp is not lit, the peripheral portion of the lamp or the lens 22 is seen to be black due to the bonding agent 18, a peripheral portion inner side of the first mentioned peripheral portion is seen to be grey colored due to the smoke coating 25, and a portion further inner side of the lamp is seen to have the color of the lens 22 itself and of the filter 26. Namely, the color of the lamp 21 is fainted gradually from the black color of the peripheral portion toward the color of the central portion of the lamp.

ADVANTAGES OF THE INVENTION

As described heretofore, the automobile lamp according to the invention includes a lamp body provided with a light source and a lens covering a front opening of the lamp body, wherein the lamp body is formed to have a mounting groove in the periphery of the front opening, the lens is formed to have a peripheral wall projecting rearward for fitting in the mounting groove, a generally dark colored composition is interposed between the mounting groove of the lamp body and the peripheral wall of the lens, and a peripheral portion of the lens is applied with a color coating with the color of which coating being similar to and fainter than that of the composition.

Therefore, when the lamp is not lit, the peripheral portion of the lens is seen to have the color of the composition filled in the lens mounting groove, a portion adjacent to and inner side of first mentioned portion is seen to have the color of the smoke coating being applied on the peripheral portion of the lens, and a portion inner side of the second mentioned portion or the central portion of the lamp is seen to have the color of the lens itself. Thus, the color is gradated or fainted gradually or steppingly from a deep color of the composition in the peripheral portion toward the fainted color of the lens in the central portion. And such gradation effects can be attained by applying at least one smoke coating process.

Further, according to another embodiment, the lamp includes a lamp body provided with a light source, an outer lens covering a front opening of the lamp body and an inner lens disposed inside of the outer lens, wherein the lamp body is formed to have a mounting groove in the periphery of the front opening, the outer lens is formed to have a peripheral wall for fitting in the mounting groove in the lamp body, a generally dark colored composition is interposed between the mounting groove in the lamp body and the peripheral wall of the outer lens, and a peripheral portion of the inner lens is applied by a smoke coating process with the color of which coating being nearly similar to and fainter than that of the composition.

Thus, similar to the first mentioned embodiment, the gradation effects can be attained by applying at least one smoke coating process.

In the embodiment shown in FIG. 1 through FIG. 4, the inner lens consists of a red colored transparent lens portion and a colorless transparent lens portion, and a fainted smoke color coating process is applied on the outer lens; and in the second embodiment shown in FIGS. 5 and 6, an outer lens is colorless and transparent, and a filter of amber colored is disposed between a portion of the outer lens and the light source. However, it will be noted that the invention is not limited to these embodiments, and the color and the arrangement of the lens and filter may be determined as desired. Further, the lamps shown in the embodiments are so-called combination lamp having two lamp chambers and provided on the rear side of the automobile, but the lamp may have only one or three or more lamp chambers, and may be a front or side lamp. In particular, the invention may be applied to any types of automobile lamps provided that the lamps fall in the spirit and scope of the invention as defined by the claims.

What is claimed is:

1. An automobile lamp including a lamp body provided with a light source and a lens covering a front opening of the lamp body, wherein the lamp body is formed to have a mounting groove in the periphery of the front opening, the lens is formed to have a peripheral wall projecting rearward for fitting in the mounting groove, a colored composition is interposed between the mounting groove of the lamp body and the peripheral wall of the lens, and a peripheral portion of the lens surface is formed to have a color being substantially same to and fainter than that of the composition.

2. An automobile lamp according to claim 1, wherein said color is applied by a smoke coating process.

3. An automobile lamp according to claim 2, wherein the colored composition is a dark colored bonding agent.

4. An automobile lamp according to claim 1, wherein the colored composition is a dark colored sealing agent.

5. An automobile lamp according to claim 2, wherein a smoke coating process is applied on the inner surface of the lens surface.

6. An automobile lamp according to claim 1, wherein the lamp body includes two lamp chambers arranged side by side and the lamp acts as a rear combination lamp.

7. An automobile lamp including a lamp body provided with a light source, an outer lens covering a front opening of the lamp body and an inner lens disposed inside of the outer lens, wherein the lamp body is formed to have a mounting groove in the periphery of the front opening, the outer lens is formed to have a peripheral wall projecting rearward for fitting in the mounting groove, a colored composition is interposed between the mounting groove of the lamp body and the peripheral wall of the outer lens, and a peripheral portion of the lens surface of the inner lens is formed to have a color of substantially same to and fainter than that of the composition.

8. An automobile lamp according to claim 7, wherein the colored composition is a dark colored bonding agent.

9. An automobile lamp according to claim 7, wherein the colored composition is a dark colored sealing agent.

10. An automobile lamp according to claim 7, wherein the lamp body includes two lamp chambers arranged side by side and the lamp acts as a rear combination lamp.

11. An automobile lamp according to claim 7, wherein said color is applied by a smoke coating process and on the front surface of the inner lens.

12. An automobile lamp including a lamp body provided with a light source and a lens covering a front opening of the lamp body, said lamp body being formed with a mounting groove along the periphery of the front opening, said lens having a rearwardly projecting peripheral wall for fitting within said mounting groove, a colored composition interposed between said mounting groove of said lamp body and said peripheral wall of said lens, and means for providing the appearance of a lighter color along a peripheral portion of said lens adjacent said colored composition.

* * * * *